Jan. 26, 1954 A. JOHNSTON ET AL 2,667,295
TURRET TYPE LUGGAGE CARRIER FOR AUTOMOTIVE VEHICLES
Filed Nov. 12, 1952 3 Sheets-Sheet 1

INVENTORS
ALLEN JOHNSTON
LEO F. LOTTER
BY
*Young & Wright*
ATTORNEYS

Jan. 26, 1954  A. JOHNSTON ET AL  2,667,295
TURRET TYPE LUGGAGE CARRIER FOR AUTOMOTIVE VEHICLES
Filed Nov. 12, 1952  3 Sheets-Sheet 2
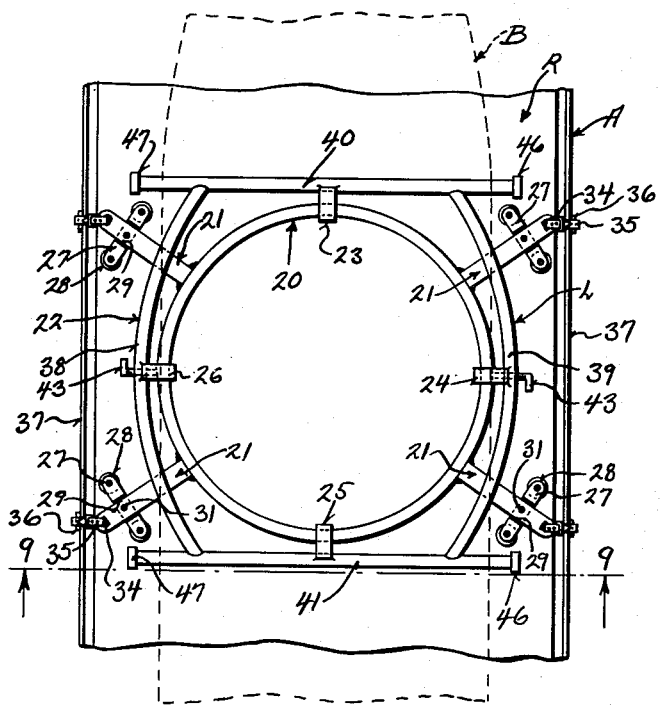
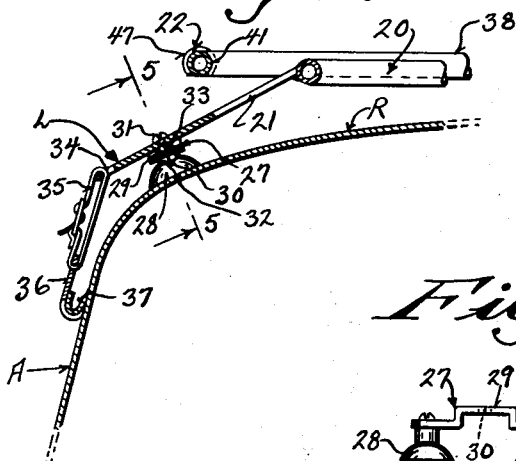
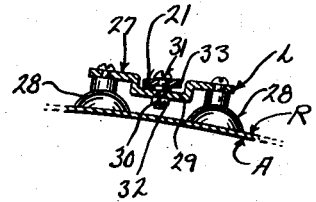
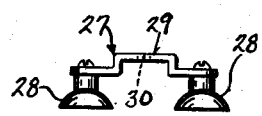
INVENTORS
ALLEN JOHNSTON
LEO F. LOTTER
BY *Young & Wright*
ATTORNEYS Jan. 26, 1954 A. JOHNSTON ET AL 2,667,295
TURRET TYPE LUGGAGE CARRIER FOR AUTOMOTIVE VEHICLES
Filed Nov. 12, 1952 3 Sheets-Sheet 3

INVENTORS
ALLEN JOHNSTON
LEO F. LOTTER

BY

*Young and Wright*

ATTORNEYS

Patented Jan. 26, 1954

2,667,295

UNITED STATES PATENT OFFICE 2,667,295

TURRET TYPE LUGGAGE CARRIER FOR AUTOMOTIVE VEHICLES

Allen Johnston and Leo F. Lotter, Oconto Falls, Wis.

Application November 12, 1952, Serial No. 319,856

2 Claims. (Cl. 224—42.1)

This invention appertains to luggage carriers and more particularly to a turret type luggage carrier for carrying boats and the like on automotive vehicles.

Heretofore, much difficulty has been experienced in placing and securing a boat to a fixed carrier on the roof of an automotive vehicle. This difficulty stems from the fact that the boat is invariably of such length that it must be laid longitudinally of the vehicle and therefore, usually requires two persons to successfully load a boat from either end of the vehicle without marring or scraping either the boat or the vehicle. This is due primarily to the fact that the boat's over-all length is approximately the same as the car and that the front and rear portions of the vehicle extend considerably beyond the roof portion. Therefore, unless more than one person is available to lift the boat, it would require much time, effort and considerable skill on the part of any person to load the boat on the vehicle without damaging one or the other. In order to overcome these difficulties, attempts have been made in the past to load the boat from the side of the vehicle on to a frame which may be turned after the boat has been secured so that the boat will lie longitudinally of the car.

While this method has the advantage of enabling one person to load and secure the boat to the vehicle, these prior devices have invariably been quite complicated, involving either rollers or gearing and the turret structure being such that the cost of manufacture has been high and assembly of the device difficult.

Therefore, a primary object of the present invention is to provide a turret type boat carrier which enables the boat to be conveniently loaded from the side of the vehicle by one person, quickly and easily secured to the turret portion of the carrier and which may then be easily rotated to position the boat longitudinally of the vehicle.

Another object of our invention is to provide a simple fixed ring frame which may be quickly and firmly secured to the vehicle roof and which carries a simple turret which, without the use of rollers or complicated gearing, may be readily rotated to any position on the rig frame and be securely locked in that position.

A further object of our invention resides in the use of novel strap and stirrup means for quickly and easily securing the boat to the cross bars of the rotatable turret.

Another important object of our invention is to provide radially extending legs of novel construction for rigidly securing the ring frame to the automotive vehicle, which legs include adjustable hooks adapted to be secured to the rain gutter and suction cups adapted to be secured to the roof of the automotive vehicle, which cups are affixed to a cross bracket carried by the legs in such a manner that the height of the frame above the roof of the car may be varied by reversing the cross bracket.

Still another object of the invention is to provide a simple, practical, and reliable construction that is economical to manufacture, easy to assemble, and positive in its operation.

With these and other objects in view, which will more readily appear as the nature of the invention is better understood, the same consists in the novel construction, combination and arrangement of parts hereinafter more fully described, illustrated and claimed.

A preferred and practical embodiment of our invention is shown in the accompanying drawings, in which:

Figure 3 is a top plan view of our luggage carrier similar to Figure 2 of the drawings but, showing the turret turned to its boat carrying position with the boat again being shown in dotted lines and extending longitudinally of the vehicle;

Figure 4 is an enlarged sectional fragmentary view through one of the novel radially extending legs for rigidly securing the frame to the vehicle roof;

Figure 5 is a vertical sectional view through one of the cross brackets for securing the suction cups to the frame leg, the section being taken on the lines 5—5 of Figures 2 and 4 respectively, looking in the direction of the arrows;

Figure 6 is a front elevational view of our novel suction cup bracket shown in Figure 5 of the drawings but, illustrating the bracket reversed to give greater height to the frame;

Referring now to the drawings in detail, wherein similar reference characters designate corresponding parts throughout the several views, the letter L generally indicates our novel luggage carrier which is shown attached to the roof R of an automotive vehicle A.

Figure 1:
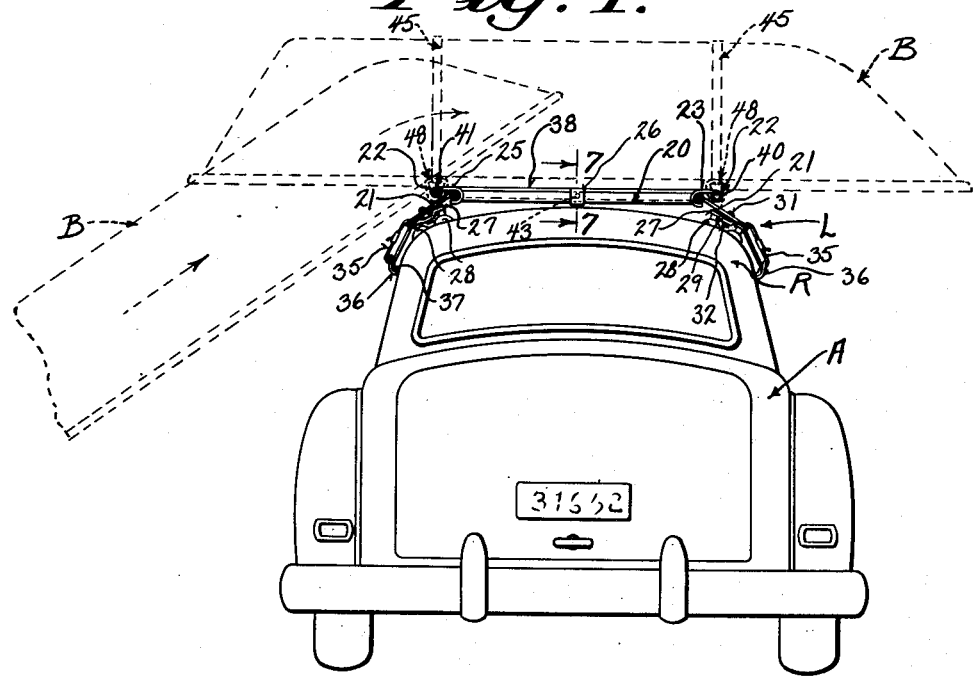
Figure 1 is a transverse sectional view of our novel luggage carrier showing the same in position on the roof of an automotive vehicle and illustrating by dotted lines, two positions of the boat when loading the same on the vehicle, the section being taken on the line 1—1 of Figure 2 and looking in the direction of the arrows.
Figure 2:
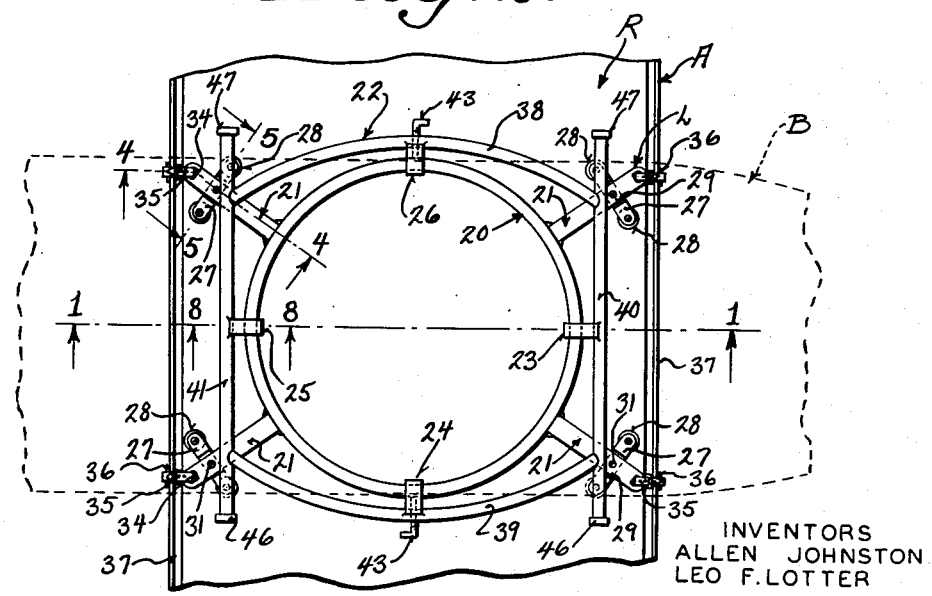
Figure 2 is a top plan view of our luggage carrier showing, in dotted lines, the boat on the carrier with the turret in the same loading position as shown in Figure 1, the car roof to which the luggage carrier is attached, being illustrated by a top fragmentary view.

The luggage carrier L includes broadly, a stationary circular ring frame 20 which is secured to the roof R of the automotive vehicle by means of four spaced, radially extending legs 21 and a rotatable turret 22 which carries sleeves 23, 24, 25 and 26 which slidably mount the turret to the ring 20. Each of the legs 21, in turn, carries adjustable cross brackets 27 to which are secured the suction cups 28 for engaging the roof R of the automotive vehicle A. The adjustable cross brackets 27 are each formed with an off-set center portion 29 which, in turn, is provided with an apperture 30 to receive the bolt 31 and nut 32, which bolt secures the bracket to its respective leg 21. If desired, a washer 33 may be interposed between the under portion of the leg 21 and the bracket 27.

Attention is now directed to Figures 5 and 6 of the drawings and it will be noted that when the cross bracket 27 is in the position shown in Figure 5, the leg 21 will be received in the hollow portion of the off-set 29 and therefore, its height above the roof R of the automotive vehicle will not be as great as it would be if the bracket 27 were reversed as illustrated in Figure 6 of the drawings and the leg attached to the upstanding portion of the off-set 29. Thus it is readily apparent, that the height of the frame above the roof of the car may be adjusted in accordance with the curvature of the roof. The end of each leg 21 is provided with an eye 34 to which is adjustably secured, by means of a strap 35, a rain gutter engaging hook 36 and, as shown, perhaps more clearly in the enlarged view of Figure 4 of the drawings, the hook engages under the rain gutter 37 of the car A. In this manner, the frame 20 is rigidly but adjustably secured to the roof R of the automotive vehicle.

The turret 22 includes a pair of spaced arcuate bars 38 and 39 and the bars 38 and 39, at their terminals, are rigidly connected to the cross bars 40 and 41. As is noted, the cross bars 40 and 41 carry the sleeves 23 and 25 for sliding movement on the ring 20 and the cross bars 38 and 39 carry the sleeves 24 and 26 respectively, for sliding movement on the ring 20.

Figure 7:
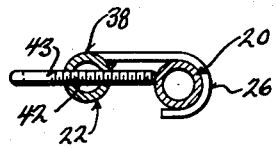
Figure 7 is a transverse sectional view through our luggage carrier, showing in particular the novel manner in which the turret is rotatably held to the ring frame and one way of locking the turret against rotation, the section being taken on the line 7—7 of Figure 1 and looking in the direction of the arrows.
Figure 8:
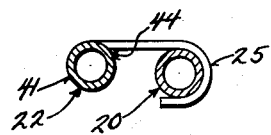
Figure 8 is a transverse sectional view similar to Figure 7 of the drawings, taken through another portion of the frame, the section being taken on the line 8—8 of Figure 2 and looking in the direction of the arrows.

Referring more particularly to Figure 7 of the drawings, it can be seen that the arcuate bar 38, adjacent the sleeve 26, is provided with a transverse central bore 42, which threadedly receives a set or crank screw 43. Upon rotation of the set screw 43 in one direction, it will be tightened against the ring frame 20 to lock the turret in any desired position. The arcuate bar 39 is also provided with a set screw, adjacent sleeve 24 and the arrangement is identical to the described construction in conjunction with sleeve 26. Cross bars 40 and 41, respectively, carry the sleeves 23 and 25 and the enlarged view of Figure 8 of the drawings illustrates how the sleeve 25 is welded, or otherwise secured, at 44, to the cross bar 41.

The luggage carrier may obviously be formed from any desired material but, in the preferred form, the same is constructed of metal tubes and the various parts may be secured by any conventional means. However, as shown, the legs 21, sleeves 23, 24, and 25 respectively, are all welded to the respective portions of the frame 20 and the turret 22.

Figure 9:
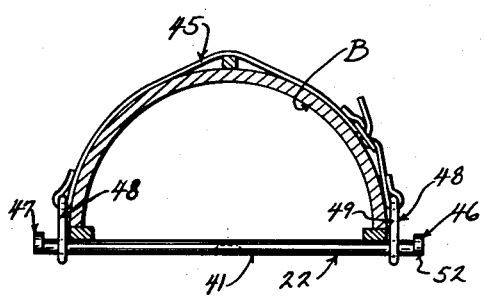
Figure 9 is an end view of one of the cross bars of the turret showing the boat in full lines and in section and illustrating in particular how the boat is held to the turret, the view being represented by the line 9—9 of Figure 3 and looking in the direction of the arrows.
Figure 10:
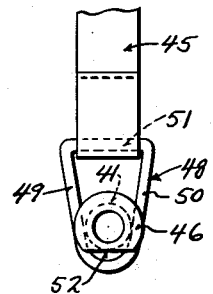
Figure 10 is an enlarged fragmentary side view of the cross bar and strap for holding the boat to the frame.
Figure 11:
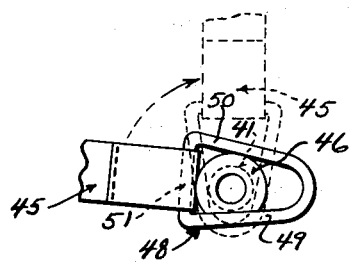
Figure 11 is an enlarged fragmentary view similar to Figure 10 of the drawings and showing, in particular, how the strap is placed on the cross bar by being moved from its full line position in the direction of the arrows to its dotted line position.

The boat B is held on the turret 22 by means of adjustable straps 45 which are detachably secured to each of the cross bars 40 and 41 respectively. The novel manner in which the ends of the straps 45 are secured to the respective cross bar forms an important feature of our invention and referring now more particularly to Figures 9, 10 and 11 of the drawings, it will be noted that each cross bar is provided with substantially circular ends 46 and 47 respectively. In as much as each of the cross bars 40 and 41 and the straps 45 are identical in structure, only the arrangement and construction of cross bar 41 will be described in detail. Each end of the strap 45 carries a metallic wire stirrup 48 which is substantially triangular in shape and embodies diverging elongated side legs 49 and 50, joined at their upper ends by the cross leg 51. The end circular lips 46 and 47 respectively, of the cross bar 41, are each flattened on their lower ends and this flattened surface 52 terminates in alignment with the bottom surface of the bar 41. It is to be noted (Figure 11) that when the stirrup 48 is turned so that one of the longer legs 49 or 50 is in alignment with the flat surface 52, the enlarged upper portion of the stirrup will allow the circular lip end 46 of the bar 41 to pass therethrough.

However, when the strap 45 and stirrup 48 are turned in the direction of the arrows to its dotted line position, the smaller lower portion of the stirrup, formed by the diverging legs 49 and 50, will be received behind the circular lip 46 and therefore, the strap 45 can not be accidentally removed from the end of the bar.

In utilizing our novel luggage carrier, it will be assumed that the same has been firmly secured to the roof of the automotive vehicle and the turret turned to its loading position, as shown in Figure 1 of the drawings. It is only necessary to tighten the set screws 43 so that the turret will be locked against rotation. The boat B is then turned up-side-down and the top of the boat is rested against the cross bar 41. The boat is then raised and pushed forwardly on the turret until it is centrally positioned on the cross bars 40 and 41, as shown in the dotted lines of Figure 1 of the drawings. The straps 45 are then adjusted to the thickness of the boat and the stirrup ends 48 are secured to the respective ends of the cross bars 40 and 41, as previously described. The set screws 43 are then loosened so that the turret may be easily rotated until the boat is positioned longitudinally of the vehicle, as shown more particularly in Figure 3 of the drawings. The set screws 43 are again tightened against the ring frame 20 and the boat and turret will be locked in position. In unloading the boat, the procedure is merely reversed.

From the foregoing, it is obvious that one person may readily and easily load the boat on the vehicle without damaging either the vehicle or the boat and it is believed that the features and advantages of the invention will be readily apparent to those skilled in the art and it will, of course, be understood that changes in the form, proportions, and minor details of construction may be resorted to without departing from the spirit of the invention or the scope of the appended claims.

We claim:

1. A turret type luggage carrier for carrying a boat and the like on the roof of an automotive vehicle comprising, a tubular ring frame, a series of spaced radially extending legs rigidly secured to said ring, a cross bracket secured to each leg intermediate its ends, said bracket detachably carrying a suction cup at its respective end terminal, a central off-set portion formed in each bracket at the point where the bracket is secured to said leg, whereby the height of each leg above the roof may be varied by reversing the bracket, an end hook for each leg adapted to engage the roof rain gutter, a turret positioned above said ring and having its inner periphery terminating beyond the outer periphery of the ring, a series of spaced inwardly and downwardly directed sleeves rigidly secured to said turret, each sleeve terminating in a U-shaped end adapted to be slidably mounted on said ring, and means for detachably fastening a boat to said turret.

2. A turret type luggage carrier for carrying a boat and the like on the roof of an automotive vehicle comprising, an inner tubular ring frame rigidly secured to the roof of an automotive vehicle, an outer turret rotatably mounted on said ring, said turret including a pair of spaced parallel cross bars and a pair of spaced arcuate transverse bars connecting the cross bars to each other, said turret being positioned above said ring and having the inner periphery of said bars terminating beyond the outer periphery of the ring, means for locking said turret against rotation on the frame, and means for detachably fastening the boat to said turret, whereby a boat may be loaded on the turret from either side of the automotive vehicle and then rotated to position the boat longitudinally of the vehicle.

ALLEN JOHNSTON.
LEO F. LOTTER.

References Cited in the file of this patent

UNITED STATES PATENTS

| Number | Name | Date |
| --- | --- | --- |
| 2,446,092 | Lait | July 27, 1948 |
| 2,600,082 | Sumner | June 10, 1952 |